United States Patent Office 3,123,644
Patented Mar. 3, 1964

3,123,644
DEALKYLATION OF NUCLEAR POLYALKYL PRIMARY AROMATIC AMINES
John F. Olin, Dayton, Ohio, assignor to Monsanto Chemical Company, St. Louis, Mo., a corporation of Delaware
No Drawing. Filed July 2, 1959, Ser. No. 824,457
9 Claims. (Cl. 260—578)

This invention relates to the preparation of nuclearly substituted derivatives of primary aromatic amines. More particularly, this invention relates to the dealkylation of nuclear polyalkyl primary aromatic amines to form mono-nuclear alkyl primary aromatic amines in high yields. This invention especially contemplates the preparation of the para-tert-alkyl anilines.

The para-alkyl primary aromatic amines of this invention are useful in medicine as antiseptics, in the dye and rubber industries for organic synthesis, in the manufacture of resin, varnishes, Bakelite and similar products, and as intermediate compounds in the production of the above compounds. Also, these aromatic amines, and the products made from them, have been found to be useful as antioxidants in the preparation of synthetic rubber and as additives in improving the discoloration, fatigue and cracking properties of natural rubbers as well as synthetic rubbers. Although the ortho- and meta-isomers of the alkylated primary aromatic amines have some of the similar properties of the para-isomers, the activity of the para-isomers in many of these uses is somewhat higher than is the activity of the ortho- and meta-isomers.

In the past, primary aromatic amines have been alkylated with olefins in the presence of various catalysts to form a mono-nuclear alkylated aromatic amine. In some of these processes, substantial quantities of nuclear polyalkylated aromatic amines have also been produced. Although the nuclear polyalkyl primary aromatic amines have many uses distinct from the uses of the mono-nuclear alkylated compounds, there is sometimes no immediate need for the nuclear polyalkylated compounds so that it becomes desirable to dealkylate these nuclear polyalkylated compounds to form the mono-nuclear alkylated compounds.

An object of this invention is to provide a process for dealkylating nuclear polyalkyl primary aromatic amines to form mono-nuclear alkyl primary aromatic amines.

Another object of this invention is to provide a process for producing para-alkyl primary aromatic amines from nuclear polyalkyl primary aromatic amines and primary aromatic amines.

Another object of this invention is to provide a process for removing tertiary alkyl groups from nuclear polyalkyl primary aromatic amines.

Other objects and advantages of this invention will be apparent to one skilled in the art upon studying this disclosure.

In accordance with this invention a nuclear polyalkyl primary aromatic amine having a tertiary alkyl group of 4 or 5 carbon atoms on at least one nuclear carbon atom in the ortho-position with respect to the amino group is converted into mono-nuclear primary aromatic amines by heating said nuclear polyalkyl primary aromatic amine at a temperature in the range of 150–350° C. under superatmospheric pressure with an acceptor aromatic amine having an hydrogen atom on a nuclear carbon atom in the para-position with respect to the amino group in the presence of a finely divided silica-alumina type catalyst. In the process of this invention, dealkylation of the nuclear polyalkyl primary aromatic amine is effected by removal of tertiary alkyl groups from nuclear carbon atoms located in the ortho-positions with respect to the amino group to form para tertiary alkyl primary aromatic amines by reaction with the acceptor aromatic amine having an hydrogen on a nuclear carbon atom in the para-position with respect to the amino group. Thus, the acceptor aromatic amine is nuclearly alkylated while the nuclear tertiary polyalkyl primary aromatic amine is dealkylated.

The nuclear polyalkyl primary aromatic amine which can be used in carrying out the dealkylation process of this invention can be any such alkylated aromatic amine having tertiary alkyl groups of 4 or 5 carbon atoms on at least one nuclear carbon atom in the ortho-positions with respect to the amino group of the aromatic amine. Polyalkylated primary aromatic amine having alkyl groups on nuclear carbon atoms other than the nuclear carbon atoms in the ortho-positions can also be used. These latter alkyl groups can be either straight-chain or branched-chain radicals having from 1 to 8 carbon atoms per radical. Thus, a nuclear polyalkylated aromatic amine having tertiary alkyl groups in both the ortho- and para-positions can be dealkylated in accordance with this invention. Illustrated examples of some of the nuclear polyalkylated aromatic amines which can be used include 2,4-di-tert-butylaniline, 2,4-di-tert-amylaniline, 2,6-di-tert-butylaniline, 2,6-di-tert-amylaniline, 2,4,6-tri-tert-butylaniline, 2,4,6-tri-tert-amylaniline, 2-tert-butyl-4-methylaniline, 2-tert-butyl-4,6-dimethylaniline, 2,6-di-tert-butyl-4-methylaniline, 2-tert-amyl-4-methylaniline, 2-tert-amyl-4,6-dimethylaniline, 2,6-di-tert-amyl-4-methylaniline, 2-tert-butyl-4-propylaniline, 2-tert-butyl-4,6-propylaniline, 2,6-di-tert-butyl-4-methylaniline, 2-tert-amyl-4-propylaniline, 2-tert-amyl-4,6-propylaniline, and 2,6-di-tert-amyl-4-methylaniline. Other nuclear polyalkylated primary aromatic amines can also be used so long as the aromatic amines contain a tertiary alkyl groups of either 4 or 5 carbon atoms on at least one of the ortho nuclear carbon atoms.

The acceptor aromatic amines used in the dealkylation process of this invention can be any primary aromatic amine having an hydrogen on the nuclear carbon atom in the para-position with respect to the amino group of the aromatic amine. Included within this class of aromatic amines are the nuclear mono- and poly-alkylated aromatic amines having alkyl groups of from 1 to 8 carbon atoms in a straight-chain attached to any of the nuclear carbon atoms except the nuclear carbon atom in the para-position. Thus, the acceptor aromatic amine reagent can be non-alkylated as well as both mono- and poly-alkylated primary aromatic amines. Preferably, the acceptor aromatic amine is non-alkylated and phenylamine or aniline is the preferred reagent. Illustrative examples of some of the mono- and poly-alkylated primary aromatic amines which can be used include 2-methylaniline, 3-methylaniline, 2,3-dimethylaniline, 2,6-dimethylaniline, 2-propylaniline, 3-propylaniline, 2,3-dipropylaniline and 2,6-dipropylaniline.

In general, the dealkylation process of this invention can be carried out at temperatures ranging from about 150° C. to about 350° C. Higher temperatures can also be used but shorter contact times must then be used to prevent diphenylamine formation. Usually, a temperature in the range of from 225° C. to about 275° C. is used and a temperature in this range is preferred. The optimum temperature selected depends not only upon the particular reactants employed, but also upon the amount of catalyst and the pressure used and the activity of the catalyst. In general, large amounts of catalyst and catalysts of high activity permit the optimum temperature to be lowered by about 25° C. The optimum temperature for dealkylating 2,4-di-tert-butylaniline with phenylamine is about 250° C. when employing a silica-alumina catalyst of average activity in an amount of 20% by weight of the phenylamine charged.

The dealkylation process of this invention is carried out at superatmospheric pressure, usually at a pressure higher than 100 p.s.i.g. Where the dealkylation is carried out in a closed vessel, the autogenous pressure produced by the reaction mixture is ordinarily sufficient. High pressures do not have any appreciable detrimental effect on the dealkylation reactions and any detrimental effect can be compensated for by raising the temperature. Pressures as high as 10,000 p.s.i.g. or higher can be used. Such pressures can be readily obtained by introducing inert gases, such as nitrogen, into the reaction vessel.

The amounts of acceptor aromatic amines and nuclear polyalkyl primary aromatic amines reacted are, in general, not critical at temperatures within the optimum temperature range. Dealkylation of the nuclear polyalkyl aromatic amine takes place when equimolar amounts of the acceptor aromatic amine are used; however, preferably a molar excess of the primary aromatic amine is used. Ordinarily, an acceptor aromatic amine/nuclear polyalkyl aromatic amine mol ratio in the range of from 1:1 to 5:1 is used. The extent of the dealkylation of the nuclear polyalkyl aromatic amine is determined by the amount of acceptor aromatic amine present in the reaction mixture and a tri-tert-alkylated aromatic amine will require a larger amount of acceptor aromatic amine than will a di-tert-alkylated aromatic amine for complete dealkylation of the nuclear polyalkylated compound. Thus, the degree of dealkylation can be readily regulated to reduce the number of tertiary alkyl groups from 3 to 2 by controlling the amount of acceptor aromatic amine employed.

The time of reaction does not appear to be critical so long as an excessively long reaction time is not used since excessively long reaction times may result in the production of some polyisoolefins. In general, the dealkylation reactions can be completed in a time as short as 10 minutes but sometimes a reaction time as long as 48 hours will be required, depending upon the temperature, the amount of catalyst used, the quantities of the reactants, the agitation of the reaction vessel, and the like. The optimum reaction time can be readily determined by one skilled in the art.

The amount of catalyst used is dependent upon the activity of the catalyst, the particular reactants used, and the temperature at which the dealkylation is carried out. At the higher temperatures, somewhat smaller amounts of catalyst can be used at lower temperatures. Also, smaller amounts of highly active catalysts can be used than is required with catalyst of average or lower activity. Generally, the amount of catalyst used should be between 1 and 200% by weight of the amount of acceptor aromatic amine. Preferably, the quantity of catalyst amounts to 20% by weight of the amount of acceptor aromatic amine.

The catalyst employed in the process of this invention can be any of the well known silica-alumina type alkylation catalysts. The catalysts can be either a naturally-occurring clay, or a synthetically prepared catalyst. Naturally-occurring clays are preferred from the economic viewpoint; however, synthetically prepared catalysts are equally effective. Examples of naturally-occurring catalysts include Florida earth, fuller's earth, Japanese clay and gumbrin. Retrol and Tonsil are two commercially available natural catalysts which are preferably employed in the process of this invention. Retrol contains, on a volatile-free basis, approximately 71% silica, 17% alumina, 3.9% iron oxide, and 3.2% magnesium oxide together with minor amounts of potassium and titanium. The Retrol catalyst also contains free moisture amounting to approximately 18.0% by weight and free and combined moisture amounting to 21% by weight. The removal of the free water at a temperature in the range of 100–200° C. enhances the activity of the catalyst but the removal of the combined water at a temperature of 1000° F., for example, tends to inactivate the catalyst. Retrol is an acidized activated catalyst having an acidity equivalent to 10.0 mg. KOH/gm. and the activity of the catalyst can be further increased by treating the catalyst with an acid, particularly hydrochloric acid. The synthetic catalysts, which can be prepared by impregnation, by coprecipitation, or by any of the well known methods for preparing catalysts, can also be activated by treatment with mineral acids.

The advantages, desirability and usefulness of the present process in the dealkylation of nuclear polyalkyl primary aromatic amines are well illustrated by the following example.

Example 2,4-di-tert-butylaniline was dealkylated to para-tert-butylaniline by heating 520 gm. (2.5 moles) of the polyalkylated aniline with 279 gm. (3 moles) of aniline for four hours at 250° C. in a 3-liter pressure bomb in the presence of 100 gm. Retrol catalyst. The pressure in the bomb was 200 p.s.i.g.

After the reaction was completed, the pressure bomb was opened and the catalyst was separated from the effluent by filtration. The filtrate was then fractionally distilled at 18 mm. pressure and 452 gm. of p-tert-butylaniline was recovered at a temperature of 118–122° C. The recovered product had a refractive index of 1.5362 at 25° C. with sodium light. The acetyl derivative of this product crystallizes from alcohol in the form of flakes, melting at 172–173° C. The conversion of the polyalkylated aniline to the monoalkylated aniline amounted to 61%.

Reasonable variation and modification are possible within the scope of the foregoing disclosure and the appended claims, the essence of which is a process for effecting dealkylation of nuclear polyalkyl primary aromatic amines having a tertiary alkyl group on at least one nuclear carbon atom in the ortho-positions with respect to the amino group with an acceptor aromatic amine having an hydrogen atom on a nuclear carbon atom in the para-position with respect to the amino group in the presence of a finely divided silica-alumina-catalyst at a temperature in the range of 150–350° C. to form para-isomers of nuclearly alkylated primary aromatic amines.

I claim:

1. A process for removing tertiary alkyl groups from nuclear polyalkylated primary aromatic amines of the formula

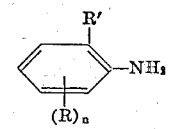

wherein R is an alkyl radical having from 1 to 8 carbon atoms, $n$ is an integer from 1 to 4, and R' is selected from the group consisting of tert-butyl and tert-amyl, said process comprising heating said nuclear polyalkyl primary aromatic amine with an acceptor aromatic amine of the formula

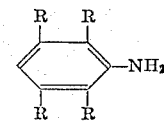

wherein R is selected from the class consisting of the hydrogen atom and alkyl radical having from 1 to 8 carbon atoms in a straight chain at a temperature in the range of 150–350° C. under superatmospheric pressure in the presence of a silica-alumina catalyst.

2. A process according to claim 1 wherein said heating is conducted at a temperature in the range of 225–275° C.

3. A process according to claim 2 wherein said acceptor aromatic amine is phenylamine.

4. A process according to claim 3 wherein said nuclear polyalkylated primary aromatic amine is 2,4-di-tert-butylaniline.

5. A process according to claim 3 wherein said nuclear polyalkylated primary aromatic amine is 2,4,6-tri-tert-butylaniline.

6. A process according to claim 3 wherein said nuclear polyalkylated primary aromatic amine is 2,6-di-tert-butylaniline.

7. A process according to claim 3 wherein said nuclear polyalkylated primary aromatic amine is 2,4-di-tert-amylaniline.

8. A process according to claim 3 wherein said nuclear polyalkylated primary atomic amine is 2,4,6-tri-tert-amylaniline.

9. A process for dealkylating 2,4-di-tert-butylaniline to form para-tert-butylaniline comprising heating said 2,4-di-tert-butylaniline with an approximately equimolar amount of phenylamine at a temperature in the range of 225–275° C. under a pressure above 100 p.s.i.g. in the presence of silica-alumina catalyst amounting to approximately 20% by weight of the phenylamine.

References Cited in the file of this patent
UNITED STATES PATENTS

| | | |
|---|---|---|
| 1,972,599 | Perkins et al. | Sept. 4, 1934 |
| 2,206,924 | Stevens et al. | July 9, 1940 |
| 2,603,662 | Stevens et al. | July 15, 1952 |

OTHER REFERENCES

Lavrovskii et al.: Chem. Abstracts, vol. 41, page 3283 (1947).

Lavrovskii et al.: Chem. Abstracts, vol. 43, col. 4644 (1949).

Hickinbottom et al.: Jour. Chem. Soc. (1934), page 1701.